US012415540B2

(12) United States Patent
Zhang et al.

(10) Patent No.: US 12,415,540 B2
(45) Date of Patent: Sep. 16, 2025

(54) TRAJECTORY VALUE LEARNING FOR AUTONOMOUS SYSTEMS

(71) Applicant: WAABI Innovation Inc., Toronto (CA)

(72) Inventors: Chris Jia Han Zhang, Toronto (CA); Runsheng Guo, Toronto (CA); Wenyuan Zeng, Toronto (CA); Raquel Urtasun, Toronto (CA)

(73) Assignee: WAABI Innovation Inc., Toronto (CA)

( * ) Notice: Subject to any disclaimer, the term of this patent is extended or adjusted under 35 U.S.C. 154(b) by 308 days.

(21) Appl. No.: 18/179,954

(22) Filed: Mar. 7, 2023

(65) Prior Publication Data

US 2023/0278582 A1 Sep. 7, 2023

Related U.S. Application Data

(60) Provisional application No. 63/317,383, filed on Mar. 7, 2022.

(51) Int. Cl.
*B60W 60/00* (2020.01)
*B60W 50/06* (2006.01)
*G05B 13/02* (2006.01)
*G06T 7/246* (2017.01)
*G06T 7/73* (2017.01)

(52) U.S. Cl.
CPC ........ *B60W 60/0011* (2020.02); *B60W 50/06* (2013.01); *G05B 13/027* (2013.01); *G06T 7/246* (2017.01); *G06T 7/73* (2017.01); *B60W 2420/403* (2013.01); *B60W 2554/408* (2020.02); *G06T 2207/20081* (2013.01); *G06T 2207/20084* (2013.01); *G06T 2207/30241* (2013.01)

(58) Field of Classification Search
CPC ....... B60W 60/00; B60W 50/06; G06T 7/246; G06T 7/73; G05B 13/02
See application file for complete search history.

(56) References Cited

U.S. PATENT DOCUMENTS 11,203,362 B1 * 12/2021 Beijbom ............ G01C 21/3407
11,858,536 B1 * 1/2024 Liu ..................... G06N 3/0464
12,110,042 B1 * 10/2024 Hoang ............... B60W 50/0097
(Continued)

OTHER PUBLICATIONS

Zeng, W., et al, "End-to-End Interpretable Neural Motion Planner", Jan. 17, 2021, 10 pages.
(Continued)

*Primary Examiner* — Tan Q Nguyen
(74) *Attorney, Agent, or Firm* — Lathrop GPM LLP

(57) ABSTRACT

Trajectory value learning for autonomous systems includes generating an environment image from sensor input and processing the environment image through an image neural network to obtain a feature map. Trajectory value learning further includes sampling possible trajectories to obtain a candidate trajectory for an autonomous system, extracting, from the feature map, feature vectors corresponding to the candidate trajectory, combining the feature vectors into the input vector, and processing, by a score neural network model, the input vector to obtain a projected score for the candidate trajectory. Trajectory value learning further includes selecting, from the candidate trajectories, the candidate trajectory as a selected trajectory based on the projected score, and implementing the selected trajectory.

20 Claims, 10 Drawing Sheets

(56) References Cited

U.S. PATENT DOCUMENTS

| | | | | |
|---|---|---|---|---|
| 12,131,599 B1* | 10/2024 | Shah | ......................... | G07C 5/10 |
| 2021/0149404 A1* | 5/2021 | Zeng | ....................... | G01S 17/89 |
| 2023/0041975 A1* | 2/2023 | Caldwell | ........... | B60W 60/0027 |

OTHER PUBLICATIONS

Zeng, W., et al, "DSDNet: Deep Structured self-Driving Network", Aug. 13, 2020, 24 pages.

Sadat, A., et al., "Jointly Learnable Behavior and Trajectory Planning for Self-Driving Vehicles", Oct. 10, 2019, 8 pages.

He., K., et al., "Deep Residual Learning for Image Recognition", Dec. 10, 2015, 12 pages.

Hessel, M., et al., "Rainbow: Combining Improvements in Deep Reinforcement Learning", Oct. 6, 2017, 14 pages.

Chen, D., et al., "Learning to Drive from a World on Rails", Oct. 2, 2021, 13 pages.

Pan, X., et al., "Semantic Predictive Control for Explainable and Efficient Policy Learning", Jan. 1, 2019, 9 pages.

Sutton, R., "Dyna, an Integrated Architecture for Learning, Planning, and Reacting", Jan. 1, 1990, 4 pages.

Dosovitskiy, A., et al., "CARLA: An Open Urban Driving Simulator", Nov. 10, 2017, 16 pages.

Alvarez Lopez, P., et al., "Microscopic Traffic Simulation using SUMO", Nov. 4-7, 2018, 8 pages.

Treiber, M., et al., "Congested Traffic States in Empirical Observations and Microscopic Simulations", Aug. 30, 2000, 47 pages.

Kesting, A., et al., "General Lane-Changing Model MOBIL for Car-Following Models", Jan. 1, 1999, 9 pages.

\* cited by examiner

TRAJECTORY VALUE LEARNING FOR AUTONOMOUS SYSTEMS

CROSS-REFERENCE TO RELATED APPLICATIONS

This application is a non-provisional application of, and thereby claims benefit to U.S. Patent Application Ser. No. 63/317,383 filed on Mar. 7, 2022, which is incorporated herein by reference in its entirety.

BACKGROUND

Autonomous system is a self-driving mode of transportation that does not require a human pilot or human driver to move in and react to the real-world environment. Rather, the autonomous system includes a virtual driver that is the decision making portion of the autonomous system. Specifically, the virtual driver controls the actuation of the autonomous system. The virtual driver is an artificial intelligence system that learns how to interact in the real world. As an artificial intelligence system, the virtual driver is trained and tested. However, because virtual driver controls a mode of transportation in the real world, the training and testing of the virtual driver should be more rigorous than other artificial intelligence systems.

SUMMARY

In general, in one aspect, one or more embodiments relate to a method that includes generating an environment image from sensor input and processing the environment image through an image neural network to obtain a feature map. The method further includes sampling possible trajectories to obtain a candidate trajectory for an autonomous system, extracting, from the feature map, feature vectors corresponding to the candidate trajectory, combining the feature vectors into the input vector, and processing, by a score neural network model, the input vector to obtain a projected score for the candidate trajectory. The method further includes selecting, from the candidate trajectories, the candidate trajectory as a selected trajectory based on the projected score, and implementing the selected trajectory.

In general, in one aspect, one or more embodiments relate to a system that includes memory, and a computer processor comprising computer readable program code for performing operations. The operations include generating an environment image from sensor input and processing the environment image through an image neural network to obtain a feature map. The operations further include sampling possible trajectories to obtain a candidate trajectory for an autonomous system, extracting, from the feature map, feature vectors corresponding to the candidate trajectory, combining the feature vectors into the input vector, and processing, by a score neural network model, the input vector to obtain a projected score for the candidate trajectory. The operations further include selecting, from the candidate trajectories, the candidate trajectory as a selected trajectory based on the projected score, and implementing the selected trajectory.

In general, in one aspect, one or more embodiments relate to a non-transitory computer readable medium comprising computer readable program code for performing operations. The operations include generating an environment image from sensor input and processing the environment image through an image neural network to obtain a feature map. The operations further include sampling possible trajectories to obtain a candidate trajectory for an autonomous system, extracting, from the feature map, feature vectors corresponding to the candidate trajectory, combining the feature vectors into the input vector, and processing, by a score neural network model, the input vector to obtain a projected score for the candidate trajectory. The operations further include selecting, from the candidate trajectories, the candidate trajectory as a selected trajectory based on the projected score, and implementing the selected trajectory.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1:
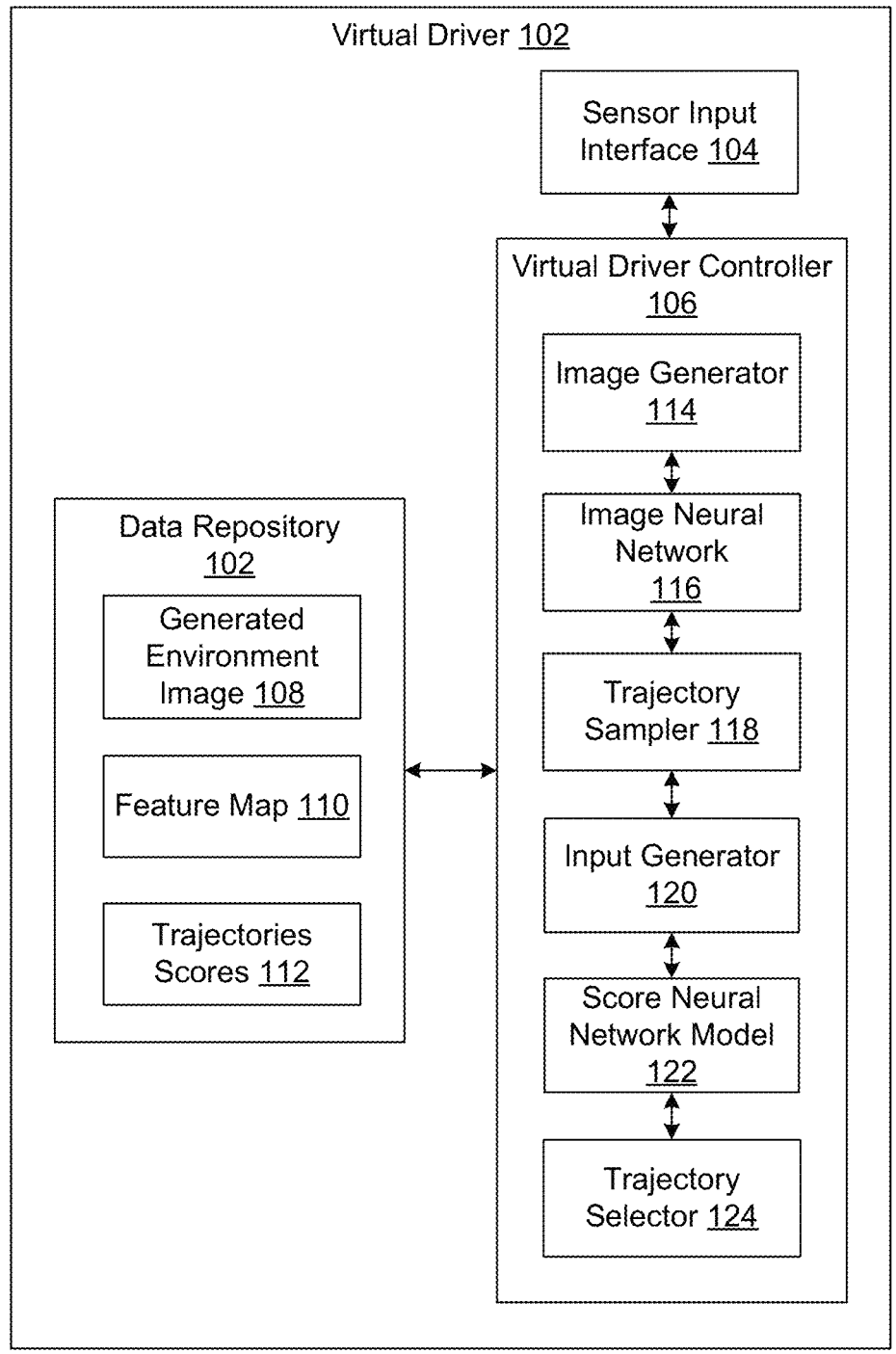
FIG. 1 shows a diagram of a virtual driver in accordance with one or more embodiments.

In general, embodiments are directed to training and using a virtual driver of an autonomous system. The virtual driver is designed to receive real-time sensor input and perform actuation actions of the autonomous system responsive to the sensor input. The actuation actions are any actions that control physical properties of the autonomous system. One or more of the actuation actions control the trajectory of the autonomous system. For example, the actuation actions may control speed, acceleration, and direction of the autonomous system. To determine the actuation actions to perform, the virtual driver reconstructs a state of the environment in which the autonomous vehicle is operating and then learns the trajectory of the autonomous system that has the best scores given the state.

In one or more embodiments, the virtual driver selects a trajectory by generating a environment image from the sensor input, and then processing the environment image through an image neural network to generate a feature map. For a candidate trajectory of the autonomous system, the virtual driver extracts a set of feature vectors from the feature map and combines the set of feature vectors into an input vector. The input vector is then passed to a score neural network that generates a projected score for the trajectory. By comparing projected scores from multiple candidate trajectory, the virtual driver selects a candidate trajectory and implements the selected trajectory.

Training the autonomous system is performed in a simulated environment. To train the autonomous system, targeted scenarios are developed that test a particular sequence of actions. The targeted scenarios are designed by generating a base targeted scenario and then adding variations to the base targeted scenario to generate multiple additional targeted scenarios. The virtual driver is then executed in the simulated environment generated according to the targeted scenarios to determine the simulated scores of the virtual drivers' selected trajectories. Based on a comparison of the simulated scores and the predicted scores, the various machine learning models of the virtual driver are updated. The result of the updating is a more accurate prediction of scores which may result in a better selection of trajectories.

An autonomous system is a self-driving mode of transportation that does not require a human pilot or human driver to move and react to the real-world environment. Rather, the autonomous system includes a virtual driver that is the decision making portion of the autonomous system. The virtual driver is an artificial intelligence system that learns how to interact in the real world. The autonomous system may be completely autonomous or semi-autonomous. As a mode of transportation, the autonomous system is contained in a housing configured to move through a real-world environment. Examples of autonomous systems include self-driving vehicles (e.g., self-driving trucks and cars), drones, airplanes, robots, etc. The virtual driver is the software that makes decisions and causes the autonomous system to interact with the real-world including moving, signaling, and stopping or maintaining a current state.

The real world environment is the portion of the real world through which the autonomous system, when trained, is designed to move. Thus, the real world environment may include interactions with concrete and land, people, animals, other autonomous systems, and human driven systems, construction, and other objects as the autonomous system moves from an origin to a destination. In order to interact with the real-world environment, the autonomous system includes various types of sensors, such as LiDAR sensors amongst other types, which are used to obtain measurements of the real-world environment and cameras that capture images from the real world environment.

FIG. 1 shows a diagram of a virtual driver (102) in accordance with one or more embodiments. Specifically, FIG. 1 shows the components of the virtual driver directed to selecting a trajectory for the autonomous vehicle. The virtual driver (102) may include additional components not shown in FIG. 1. As shown in FIG. 1, the virtual driver (102) includes a data repository (102), a sensor input interface (104), and a score predictive header (106). Each of these components is described below.

The data repository (102) is any type of storage unit and/or device (e.g., a file system, database, data structure, or any other storage mechanism) for storing data. Further, the data repository (102) may include multiple different, potentially heterogeneous, storage units and/or devices. The data repository (102) is configured to store a generated environment image (108), a feature map (110), and trajectory scores.

A generated environment image (108) is an image of the environment around the autonomous systems superimposed on a map. The generated environment image (108) may include sub-images of stationary and non-stationary objects detected by the virtual driver, whereby the relative location of the objects to each other and to the autonomous system in the generated environment image (108) match the detected locations of the objects and traffic around the autonomous system. The objects may be stationary or non-stationary objects. In one or more embodiments, the generated environment image (108) is an elevated view (e.g., top down or birds eye view) of the environment. Further, the generated environment image (108) may include a map of traffic markers and signs. For example, for an autonomous system that is a vehicle, the generated environment image may include the vehicles, bicycles, people, and other objects near the autonomous system overlaid on a roadmap. The generated environment image may further include road signs, road markings, and other traffic information. Sub-images of the objects in the generated environment image (108) may be symbolic representations of the objects scaled according to the detected size of the objects.

In one or more embodiments, the generated environment image (108) is a three dimensional raster image. Objects in the generated environment image may be separated out into different channels. For example, a lane of a road may be in one channel and a lane boundary of the road may be in another channel.

In one or more embodiments, a feature map (110) is a three dimensional representation of context features extracted from the generated environment image (108). Two dimensions of the three dimensional representation correspond to geographic positions. The third dimension is a feature vector for the geographic position. The feature vector encodes context features about the geographic position as extracted from the generated environment image. The context features are learned features that capture aspects of the input context, which is the map, other actors, etc. Which features to include, and the encoding of the feature vector are learned through machine learning. In one or more embodiments, the resolution of the feature map is less than the resolution of the generated environment image (108).

The trajectory scores (112) are scores associated with following a particular trajectory. Scores may be defined according to a variety of performance metrics of the autonomous system following the trajectories. For example, the performance metric may be smoothness, distance to other objects, whether a collision occurs, and other metrics. The score(s) for a trajectory may be the degree to which the trajectory does or does not comply with the performance metric. For example, a trajectory which is staccato may have a lower score than a trajectory that is smooth. A single trajectory may have multiple trajectory scores associated with the trajectory. For example, the trajectory scores (112) may include short term scores and long term scores. Short term scores are related to being within the time of following the trajectory associated with following the trajectory. For example, short term scores may be related to costs within the trajectory. Long term scores are related to being caused by the trajectory that are not within the trajectory. For example, long term scores may be related to costs occurring when leaving the trajectory. By way of a more specific example, long term scores may be based on an evaluation of the distance between the autonomous system and other objects when leaving the trajectory.

Continuing with FIG. 1, sensor input interface (104) is the interface by which the virtual driver receives sensor input. For example, the sensor input interface (104) may include device drivers and other software to receive the sensor input from each sensor of the autonomous system. Each sensor of the autonomous system has a corresponding known location on the autonomous system. Thus, by combining the sensor input from a sensor with the location of sensor on the autonomous system, the environment may be reconstructed.

The sensor input interface is connected to a virtual driver controller (106). The virtual driver controller (106) is configured to identify possible trajectories for a particular scenario and select a trajectory from the set of possible trajectories. A trajectory is the change in a geographic position over a timespan. A trajectory includes the geographic positions along the trajectory as well kinematic properties. Geographic positions define locations in geographic space and represent actual locations of the autonomous system in the environment (e.g., real world or simulated environment). Kinematic properties are properties related to the movement of the autonomous system in the environment. For example, kinematic properties include speed, acceleration, orientation, and curvature. Curvature is a tan of the steering angle divided by the distance from rear axle to front wheels. The trajectory may be defined by a sequence of geographic coordinates specifying the geographic positions and kinematic information specifying the kinematic properties.

In one or more embodiments, the kinematic information may specify one or more instantaneous kinematic property for each geographic position. For example, the kinematic information may specify an instantaneous velocity for a particular geographic coordinate. The kinematic information may include an average value for one or more kinematic properties that span two or more of the geographic coordinates.

The virtual driver controller (106) includes an image generator (114), an image neural network (116), a trajectory sampler (118), an input generator (120), a score neural network model (122), and a trajectory selector (124). Each of these components is described below.

The image generator (114) is configured to generate a generated environment image (108) for a geographic environment. Specifically, the image generator (114) is configured to combine the sensor input with the respect locations of the sensors to identify objects and the locations of the objects within the environment. The image generator (114) may include one or more neural network models to analyze and identify the objects. Further, the image generator (114) may be configured to overlay the objects based on respective locations on a map of the environment to create the generated environment image.

An image neural network (116) is configured to generate a feature map (108) from the generated environment image (108). The image neural network is a neural network that is configured to process images. For example, the image neural network may be a convolutional neural network (CNN). In one or more embodiments, the generated environment image may include additional channels that are processed by the CNN. The additional channels may include, for each object, history information of the object (e.g., where the object was located prior to the current sensor input), the past location of the autonomous system, and a map. The CNN takes the input generates the feature map.

The trajectory sampler (118) is configured to sample possible trajectories to generate a set of candidate trajectory.

The input generator (120) is configured to extract feature vectors from the feature map and augment the feature vectors with kinematic information based on the sampled trajectory. The input generator (120) is further configured to combine the augmented feature vectors into an input vector.

The score neural network model (122) is configured to generate trajectory scores for the candidate trajectories. In one or more embodiments, the score neural network model (122) is a machine learning model that learns how to score candidate trajectories. For example, the score neural network model (122) may learn the costs associated with following a particular trajectory from the input vector and learn how to combine the costs into the trajectory score that is a predicted score for following the trajectory. The score neural network model (122) may include multiple neural networks. Each neural network may individually provide a sub-score for scoring the trajectory. For example, a first neural network may provide a short term score and a second neural network may provide a long term score. In some embodiments, the individual neural networks are shallow (e.g., three layer) multi-layer perceptron (MLP) models.

In one or more embodiments, the trajectory selector (124) is configured to select the trajectory based on the predicted scores. Specifically, the trajectory selector (124) is configured to compare the trajectory scores of the different candidate trajectories and select the trajectory with the best predicted score.

Figure 2:
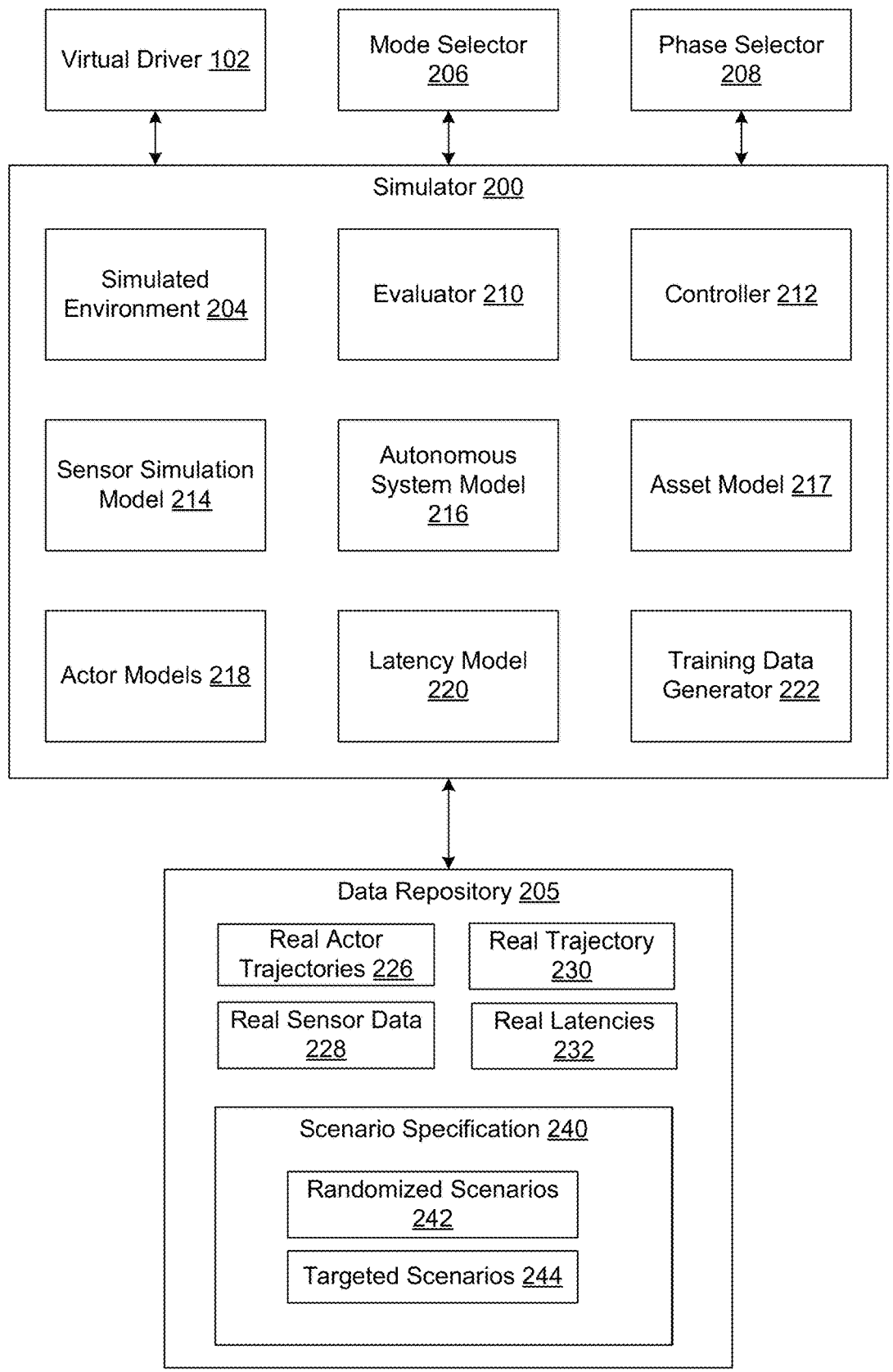
FIG. 2 shows a diagram of an autonomous training and testing system in accordance with one or more embodiments.

The testing and training of virtual driver of the autonomous systems in the real-world environment is unsafe because of the accidents that an untrained virtual driver can cause. Thus, as shown in FIG. 2, a simulator (200) is configured to train and test a virtual driver (202) of an autonomous system. For example, the simulator may be a unified, modular, mixed-reality, closed-loop simulator for autonomous systems. The simulator (200) is a configurable simulation framework that enables not only evaluation of different autonomy components in isolation, but also as a complete system in a closed-loop manner. The simulator reconstructs "digital twins" of real world scenarios automatically, enabling accurate evaluation of the virtual driver at scale. The simulator (200) may also be configured to perform mixed-reality simulation that combines real world data and simulated data to create diverse and realistic evaluation variations to provide insight into the virtual driver's performance. The mixed reality closed-loop simulation allows the simulator (200) to analyze the virtual driver's action on counterfactual "what-if" scenarios that did not occur in the real-world. The simulator (200) further includes functionality to simulate and train on rare yet safety-critical scenarios with respect to the entire autonomous system and closed-loop training to enable automatic and scalable improvement of autonomy.

The simulator (200) creates the simulated environment (204) that is a virtual world in which the virtual driver (202) is the player in the virtual world. The simulated environment (204) is a simulation of a real-world environment, which may or may not be in actual existence, in which the autonomous system is designed to move. As such, the simulated environment (204) includes a simulation of the objects (i.e., simulated objects or assets) and background in the real world, including the natural objects, construction, buildings and roads, obstacles, as well as other autonomous and non-autonomous objects. The simulated environment simulates the environmental conditions within which the autonomous system may be deployed. Additionally, the simulated environment (204) may be configured to simulate various weather conditions that may affect the inputs to the autonomous systems. The simulated objects may include both stationary and non-stationary objects. Non-stationary objects are actors in the real-world environment.

The simulator (200) also includes an evaluator (210). The evaluator (210) is configured to train and test the virtual driver (202) by creating various scenarios the simulated environment. Each scenario is a configuration of the simulated environment including, but not limited to, static portions, movement of simulated objects, actions of the simulated objects with each other and reactions to actions taken by the autonomous system and simulated objects. The evaluator (210) is further configured to evaluate the performance of the virtual driver using a variety of metrics.

The evaluator (210) assesses the performance of the virtual driver throughout the performance of the scenario. Assessing the performance may include applying rules. For example, the rules may be that the automated system does not collide with any other actor, compliance with safety and comfort standards (e.g., passengers not experiencing more than a certain acceleration force within the vehicle), the automated system not deviating from executed trajectory), or other rule. Each rule may be associated with the metric information that relates a degree of breaking the rule with a corresponding score. The evaluator (210) may be implemented as a data-driven neural network that learns to distinguish between good and bad driving behavior. The various metrics of the evaluation system may be leveraged to determine whether the automated system satisfies the requirements of success criterion for a particular scenario. Further, in addition to system level performance, for modular based virtual drivers, the evaluator may also evaluate individual modules such as segmentation or prediction performance for actors in the scene with respect to the ground truth recorded in the simulator.

In one or more embodiments, the evaluator (210) is configured to generate a simulated score based on evaluating the performance of the virtual driver. The simulated score is a combination of the corresponding scores described above. The evaluator (210) is further configured to initiate an update to the virtual driver models based on the simulated score. For example, the evaluator (210) may include functionality to generate a loss based on the simulated score and the predicted score and update the virtual driver (102) according to the loss.

The simulator (200) is configured to operate in multiple phases as selected by the phase selector (208) and modes as selected by a mode selector (206). The phase selector (208) and mode selector (206) may be a graphical user interface or application programming interface component that is configured to receive a selection of phase and mode, respectively. The selected phase and mode define the configuration of the simulator (200). Namely, the selected phase and mode define which system components communicate and the operations of the system components.

The phase may be selected using a phase selector (208). The phase may be training phase or testing phase. In the training phase, the evaluator (210) provides metric information to the virtual driver (202), which uses the metric information to update the virtual driver (202). The evaluator (210) may further use the metric information to further train the virtual driver (202) by generating scenarios for the virtual driver. In the testing phase, the evaluator (210) does not provide the metric information to the virtual driver. In the testing phase, the evaluator (210) uses the metric information to assess the virtual driver and to develop scenarios for the virtual driver (202).

The mode may be selected by the mode selector (206). The mode defines the degree to which real-world data is used, whether noise is injected into simulated data, degree of perturbations of real world data, and whether the scenarios are designed to be adversarial. Example modes include open loop simulation mode, closed loop simulation mode, single module closed loop simulation mode, fuzzy mode, and adversarial mode. In an open loop simulation mode, the virtual driver is evaluated with real world data. In a single module closed loop simulation mode, a single module of the virtual driver is tested. An example of a single module closed loop simulation mode is a localizer closed loop simulation mode in which the simulator evaluates how the localizer estimated pose drifts over time as the scenario progresses in simulation. In a training data simulation mode, simulator is used to generate training data. In a closed loop evaluation mode, the virtual driver and simulation system are executed together to evaluate system performance. In the adversarial mode, the actors are modified to perform adversarial. In the fuzzy mode, noise is injected into the scenario (e.g., to replicate signal processing noise and other types of noise). Other modes may exist without departing from the scope of the system.

The simulator (200) includes the controller (212) that includes functionality to configure the various components of the simulator (200) according to the selected mode and phase. Namely, the controller (212) may modify the configuration of the each of the components of the simulator based on configuration parameters of the simulator (200). Such components include the evaluator (210), the simulated environment (204), an autonomous system model (216), sensor simulation models (214), asset models (217), actor models (218), latency models (220), and a training data generator (222).

The autonomous system model (216) is a detailed model of the autonomous system in which the virtual driver will execute. The autonomous system model (216) includes model, geometry, physical parameters (e.g., mass distribution, points of significance), engine parameters, sensor locations and type, firing pattern of the sensors, information about the hardware on which the virtual driver executes (e.g., processor power, amount of memory, and other hardware information), and other information about the autonomous system. The various parameters of the autonomous system model may be configurable by the user or another system.

For example, if the autonomous system is a motor vehicle, the modeling and dynamics may include the type of vehicle (e.g., car, truck), make and model, geometry, physical parameters such as the mass distribution, axle positions, type and performance of engine, etc. The vehicle model may also include information about the sensors on the vehicle (e.g., camera, LiDAR, etc.), the sensors' relative firing synchronization pattern, and the sensors' calibrated extrinsics (e.g., position and orientation) and intrinsics (e.g., focal length). The vehicle model also defines the onboard computer hardware, sensor drivers, controllers, and the autonomy software release under test.

The autonomous system model includes an autonomous system dynamic model. The autonomous system dynamic model is used for dynamics simulation takes the actuation actions of the virtual driver (e.g., steering angle, desired acceleration) and enacts the actuation actions on the autonomous system in the simulated environment to update the simulated environment and the state of the autonomous system. To update the state, a kinematic motion model may be used, or a dynamics motion model that accounts for the forces applied to the vehicle may be used to determine the state. Within the simulator, with access to real log scenarios with ground truth actuations and vehicle states at each time step, embodiments may also optimize analytical vehicle model parameters or learn parameters of a neural network that infers the new state of the autonomous system given the virtual driver outputs.

In one or more embodiments, the sensor simulation models (214) models, in the simulated environment, active and passive sensor inputs. Passive sensor inputs capture the visual appearance of the simulated environment including stationary and nonstationary simulated objects from the perspective of one or more cameras based on the simulated position of the camera(s) within the simulated environment. Example of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, the measurements being simulated based on the simulated environment based on the simulated position of the sensor(s) within the simulated environment. By way of an example, the active sensor measurements may be measurements that a LiDAR sensor would make of the simulated environment over time and in relation to the movement of the autonomous system.

The sensor simulation models (214) are configured to simulates the sensor observations of the surrounding scene in the simulated environment (204) at each time step according to the sensor configuration on the vehicle platform. When the simulated environment directly represents the real world environment, without modification, the sensor output may be directly fed into the virtual driver. For light-based sensors, the sensor model simulates light as rays that interact with objects in the scene to generate the sensor data. Depending on the asset representation (e.g., of stationary and nonstationary objects), embodiments may use graphics-based rendering for assets with textured meshes, neural rendering, or a combination of multiple rendering schemes. Leveraging multiple rendering schemes enables customizable world building with improved realism. Because assets are compositional in 3D and support a standard interface of render commands, different asset representations may be composed in a seamless manner to generate the final sensor data. Additionally, for scenarios that replay what happened in a real world and use the same autonomous system as in the real world, the original sensor observations may be replayed at each time step.

Asset models (217) includes multiple models, each model modeling a particular type of individual assets in the real world. The assets may include inanimate objects such as construction barriers or traffic signs, parked cars, and background (e.g., vegetation or sky). Each of the entities in a scenario may correspond to an individual asset. As such, an asset model, or instance of a type of asset model, may exist for each of the entities or assets in the scenario. The assets can be composed together to form the three dimensional simulated environment. An asset model provides all the information needed by the simulator to simulate the asset. The asset model provides the information used by the simulator to represent and simulate the asset in the simulated environment. For example, an asset model may include geometry and bounding volume, the asset's interaction with light at various wavelengths of interest (e.g., visible for camera, infrared for LiDAR, microwave for RADAR), animation information describing deformation (e.g. rigging) or lighting changes (e.g., turn signals), material information such as friction for different surfaces, and metadata such as the asset's semantic class and key points of interest. Certain components of the asset may have different instantiations. For example, similar to rendering engines, an asset geometry may be defined in many ways, such as a mesh, voxels, point clouds, an analytical signed-distance function, or neural network. Asset models may be created either by artists, or reconstructed from real world sensor data, or optimized by an algorithm to be adversarial.

Closely related to, and possibly considered part of the set of asset models (217) are actor models (218). An actor model represents an actor in a scenario. An actor is a sentient being that has an independent decision making process. Namely, in a real world, the actor may be animate being (e.g., person or animal) that makes a decision based on an environment. The actor makes active movement rather than or in addition to passive movement. An actor model, or an instance of an actor model may exist for each actor in a scenario. The actor model is a model of the actor. If the actor is in a mode of transportation, then the actor model includes the model of transportation in which the actor is located. For example, actor models may represent pedestrians, children, vehicles being driven by drivers, pets, bicycles, and other types of actors.

The actor model leverages the scenario specification and assets to control all actors in the scene and their actions at each time step. The actor's behavior is modeled in a region of interest centered around the autonomous system. Depending on the scenario specification, the actor simulation will control the actors in the simulation to achieve the desired behavior. Actors can be controlled in various ways. One option is to leverage heuristic actor models, such as intelligent-driver model (IDM) that try to maintain a certain relative distance or time-to-collision (TTC) from a lead actor or heuristic-derived lane-change actor models. Another is to directly replay actor trajectories from a real log, or to control the actor(s) with a data-driven traffic model. Through the configurable design, embodiments may can mix and match different subsets of actors to be controlled by different behavior models. For example, far-away actors that initially may not interact with the autonomous system and can follow a real log trajectory, but when near the vicinity of the autonomous system may switch to a data-driven actor model. In another example, actors may be controlled by a heuristic or data-driven actor model that still conforms to the high-level route in a real-log. This mixed-reality simulation provides control and realism.

Further, actor models may be configured to be in cooperative or adversarial mode. In cooperative mode, the actor model models actors to act rationally in response to the state of the simulated environment. In adversarial mode, the actor model may model actors acting irrationally, such as exhibiting road rage and bad driving.

The latency model (220) represents timing latency that occurs when the autonomous system is in the real world environment. Several sources of timing latency may exist. For example, a latency may exist from the time that an event occurs to the sensors detecting the sensor information from the event and sending the sensor information to the virtual driver. Another latency may exist based on the difference between the computing hardware executing the virtual driver in the simulated environment as compared to the computing hardware of the virtual driver. Further, another timing latency may exist between the time that the virtual driver transmits an actuation signal to the autonomous system changing (e.g., direction or speed) based on the actuation signal. The latency model (220) models the various sources of timing latency.

Stated another way, in the real world, safety-critical decisions in the real world may involve fractions of a second affecting response time. The latency model simulates the exact timings and latency of different components of the onboard system. To enable scalable evaluation without strict requirement on exact hardware, the latencies and timings of the different components of autonomous system and sensor modules are modeled while running on different computer hardware. The latency model may replay latencies recorded from previously collected real world data or have a data-driven neural network that infers latencies at each time step to match the hardware in loop simulation setup.

The training data generator (222) is configured to generate training data. For example, the training data generator (222) may modify real-world scenarios to create new scenarios. The modification of real-world scenarios is referred to as mixed reality. For example, mixed-reality simulation may involve adding in new actors with novel behaviors, changing the behavior of one or more of the actors from the real-world, and modifying the sensor data in that region while keeping the remainder of the sensor data the same as the original log. In some cases, the training data generator (222) converts a benign scenario into a safety-critical scenario.

The simulator (200) is connected to a data repository (205). The data repository (205) is any type of storage unit or device that is configured to store data. The data repository (205) includes data gathered from the real world. For example, the data gathered from the real world include real actor trajectories (226), real sensor data (228), real trajectory of the system capturing the real world (230), and real latencies (232). Each of the real actor trajectories (226), real sensor data (228), real trajectory of the system capturing the real world (230), and real latencies (232) is data captured by or calculated directly from one or more sensors from the real world (e.g., in a real world log). In other words, the data gathered from the real-world are actual events that happened in real life. For example, in the case that the autonomous system is a vehicle, the real world data may be captured by a vehicle driving in the real world with sensor equipment.

Further, the data repository (205) includes functionality to store one or more scenario specifications (240). A scenario specification (240) specifies a scenario and evaluation setting for testing or training the autonomous system. For example, the scenario specification (240) may describe the initial state of the scene, such as the current state of autonomous system (e.g., the full 6D pose, velocity and acceleration), the map information specifying the road layout, and the scene layout specifying the initial state of all the dynamic actors and objects in the scenario. The scenario specification may also include dynamic actor information describing how the dynamic actors in the scenario should evolve over time which are inputs to the actor models. The dynamic actor information may include route information for the actors, desired behaviors or aggressiveness. The scenario specification (240) may be specified by a user, programmatically generated using a domain-specification-language (DSL), procedurally generated with heuristics from a data-driven algorithm, or adversarial. The scenario specification (240) can also be conditioned on data collected from a real world log, such as taking place on a specific real world map or having a subset of actors defined by their original locations and trajectories.

The scenario specification (240) may include specifications for randomized scenarios (242) and targeted scenarios (244). Randomized scenarios (242) are free-form scenarios that do not target a particular operation of the virtual driver. For example, randomized scenarios may reflect the general driving in the real world where multiple possible events may occur. Targeted scenarios (244) are scenarios testing the virtual driver's reaction to a particular event. For example, targeted scenarios (244) are specific to a particular event and test the virtual driver with respect to the event given a set of circumstances. For example, the event may be that a car moves into the lane of the virtual driver and brakes suddenly. The surrounding circumstances may be the number of other vehicles, the relative locations of the other vehicles, the speed of the autonomous system, and other such information. Some or all of the randomized or targeted scenarios may or may not be based on modified real-world scenarios. Further, the simulated environment of the randomized or targeted scenarios may or may not use actual maps of real-world geographic regions.

The interfaces between virtual driver and the simulator match the interfaces between the virtual driver and the autonomous system in the real world. For example, the sensor simulation model (214) and the virtual driver matches the virtual driver interacting with the sensors in the real world. The virtual driver is the actual autonomy software that executes on the autonomous system. The simulated sensor data that is output by the sensor simulation model (214) may be in or converted to the exact message format that the virtual driver takes as input as if the virtual driver were in the real world, and the virtual driver can then run as a black box virtual driver with the simulated latencies incorporated for components that run sequentially. The virtual driver then outputs the exact same control representation that it uses to interface with the low-level controller on the real autonomous system. The autonomous system model (216) will then update the state of the autonomous system in the simulated environment. Thus, the various simulation models of the simulator (200) run in parallel asynchronously at their own frequencies to match the real world setting.

Figure 3:
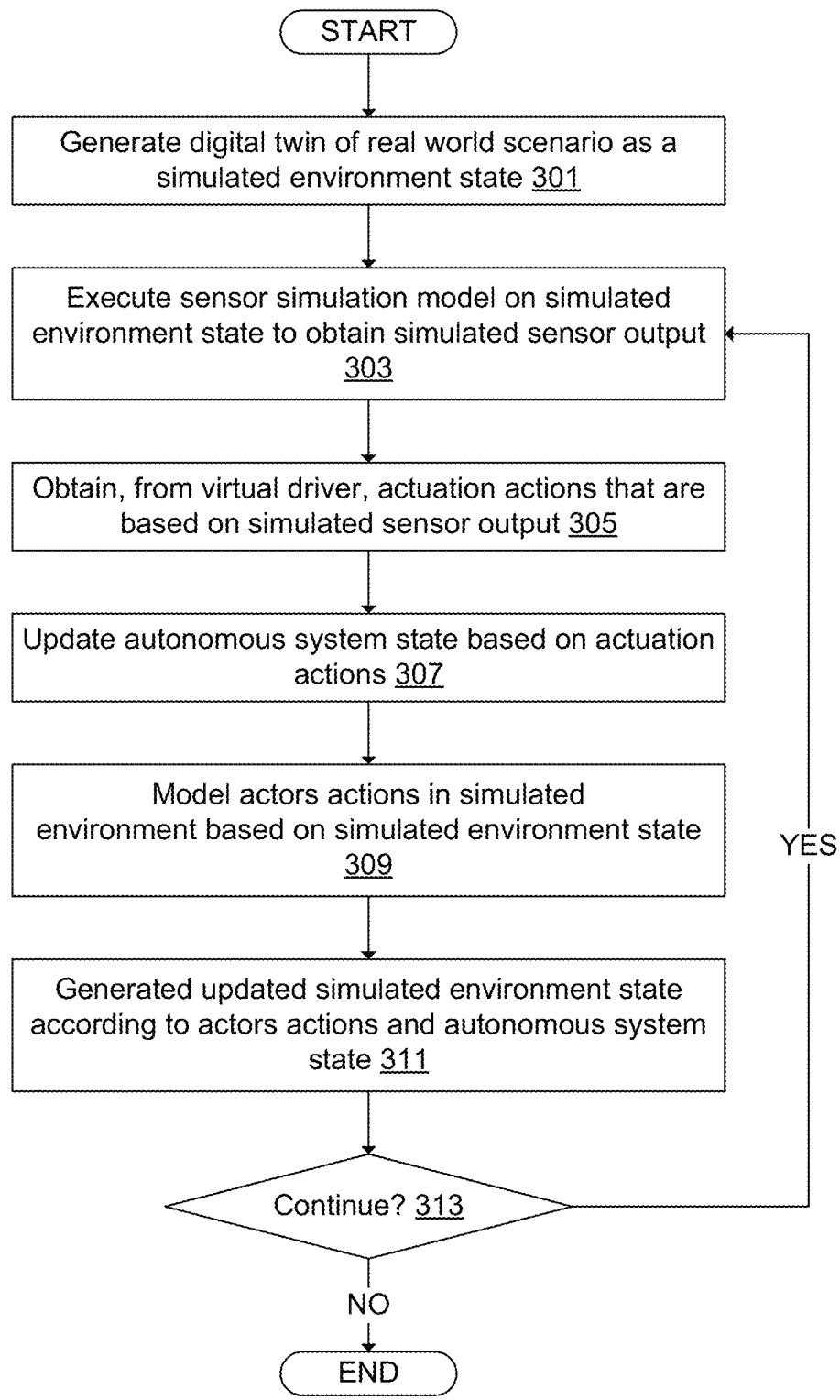
FIG. 3 shows a flowchart of the autonomous training and testing system in accordance with one or more embodiments.

FIG. 3 shows a flow diagram for executing the simulator in a closed loop mode. In Block 301, a digital twin of a real world scenario is generated as a simulated environment state. Log data from the real world is used to generate an initial virtual world. The log data defines which asset and actor models are used in an initial positioning of assets. For example, using convolutional neural networks on the log data, the various asset types within the real world may be identified. As other examples, offline perception systems and human annotations of log data may be used to identify asset types. Accordingly, corresponding asset and actor modes may be identified based on the asset types and add to the positions of the real actors and assets in the real world. Thus, the asset and actor models to create an initial three dimensional virtual world.

In Block 303, the sensor simulation model is executed on the simulated environment state to obtain simulated sensor output. The sensor simulation model may use beamforming and other techniques to replicate the view to the sensors of the autonomous system. Each sensor of the autonomous system has a corresponding sensor simulation model and a corresponding system. The sensor simulation model executes based on the position of the sensor within the virtual environment and generates simulated sensor output. The simulated sensor output is in the same form as would be received from a real sensor by the virtual driver.

The simulated sensor output is passed to the virtual driver. In Block 305, the virtual drive executes based on the simulated sensor output to generate actuation actions. The actuation actions define how the virtual driver controls the autonomous system. For example, for an SDV, the actuation actions may be amount of acceleration, movement of the steering, triggering of a turn signal, etc. From the actuation actions, the autonomous system state in the simulated environment is updated in Block 307. The actuation actions are used as input to the autonomous system model to determine the actual actions of the autonomous system. For example, the autonomous system dynamic model may use the actuation actions in addition to road and weather conditions to represent the resulting movement of the autonomous system.

For example, in a wet or snow environment, the same amount of acceleration action as in a dry environment may cause less acceleration than in the dry environment. As another example, the autonomous system model may account for possibly faulty tires (e.g., tire slippage), mechanical based latency, or other possible imperfections in the autonomous system.

In Block 309, actors' actions in the simulated environment are modeled based on the simulated environment state. Concurrently with the virtual driver model, the actor models and asset models are executed on the simulated environment state to determine an update for each of the assets and actors in the simulated environment. Here, the actors' actions may use the previous output of the evaluator to test the virtual driver. For example, if the actor is adversarial, the evaluator may indicate based on the previous action of the virtual driver, the lowest scoring metric of the virtual driver. Using a mapping of metrics to actions of the actor model, the actor model executes to exploit or test that particular metric.

Thus, in Block 311, the updated simulated environment state is updated according to the actors' actions and the autonomous system state. The updated simulated environment includes the change in positions of the actors and the autonomous system. Because the models execute independently of the real world, the update may reflect a deviation from the real world. Thus, the autonomous system is tested with new scenarios. In Block 313, a determination is made whether to continue. If the determination is made to continue, testing of the autonomous system continues using the updated simulated environment state in Block 303. At each iteration, during training, the evaluator provides feedback to the virtual driver. Thus, the parameters of the virtual driver are updated to improve performance of the virtual driver in a variety of scenarios. During testing, the evaluator is able to test using a variety of scenarios and patterns including edge cases that may be safety critical. Thus, one or more embodiments improve the virtual driver and increase safety of the virtual driver in the real world.

As shown, the virtual driver of the autonomous system acts based on the scenario and the current learned parameters of the virtual driver. The simulator obtains the actions of the autonomous system and provides a reaction in the simulated environment to the virtual driver of the autonomous system. The evaluator evaluates the performance of the virtual driver and creates scenarios based on the performance. The process may continue as the autonomous system operates in the simulated environment.

Figure 4:
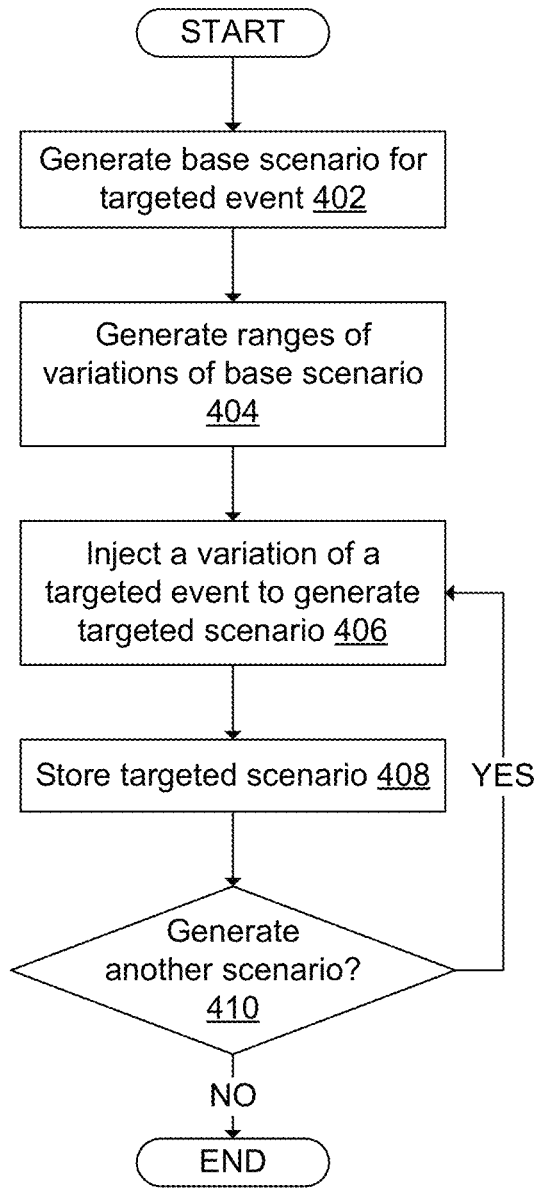
FIG. 4 shows a flowchart for generating targeted trajectories in accordance with one or more embodiments.

FIG. 4 shows a diagram for generating targeted scenarios in accordance with one or more embodiments. In Block 402, a base scenario for the targeted event is generated. The base scenario may be directed to a capability that the autonomous system is supposed to have, such as handling another car cutting in front, merging on or off the highway, or the lead actor breaking. Some actors for the scenario may be scripted actors that have parameterized values to test the particular event.

In Block 404, ranges of variations of the base scenario are defined. The ranges are defined for the parameterized values. For example, for a car cutting in front of the autonomous system, one of the parameterized values may be time to collision and another parameterized value may be the initial speed of the autonomous system. A range of different times to collision may be defined. Other parameterized values may be the number of actors, the velocity the actors and other variation.

In Block 406, a variation of the targeted event to generate a targeted scenario. From the parameterized values, a sampling is performed to obtain a sample set of values. For example, the sampling may be a random sampling or an exhaustive sampling of the parameters. In Block 408, the targeted scenario is stored. Further, a determination is made whether to generate another targeted scenario in Block 410. If a determination is made to generate another sample, the process repeats.

Figure 5:
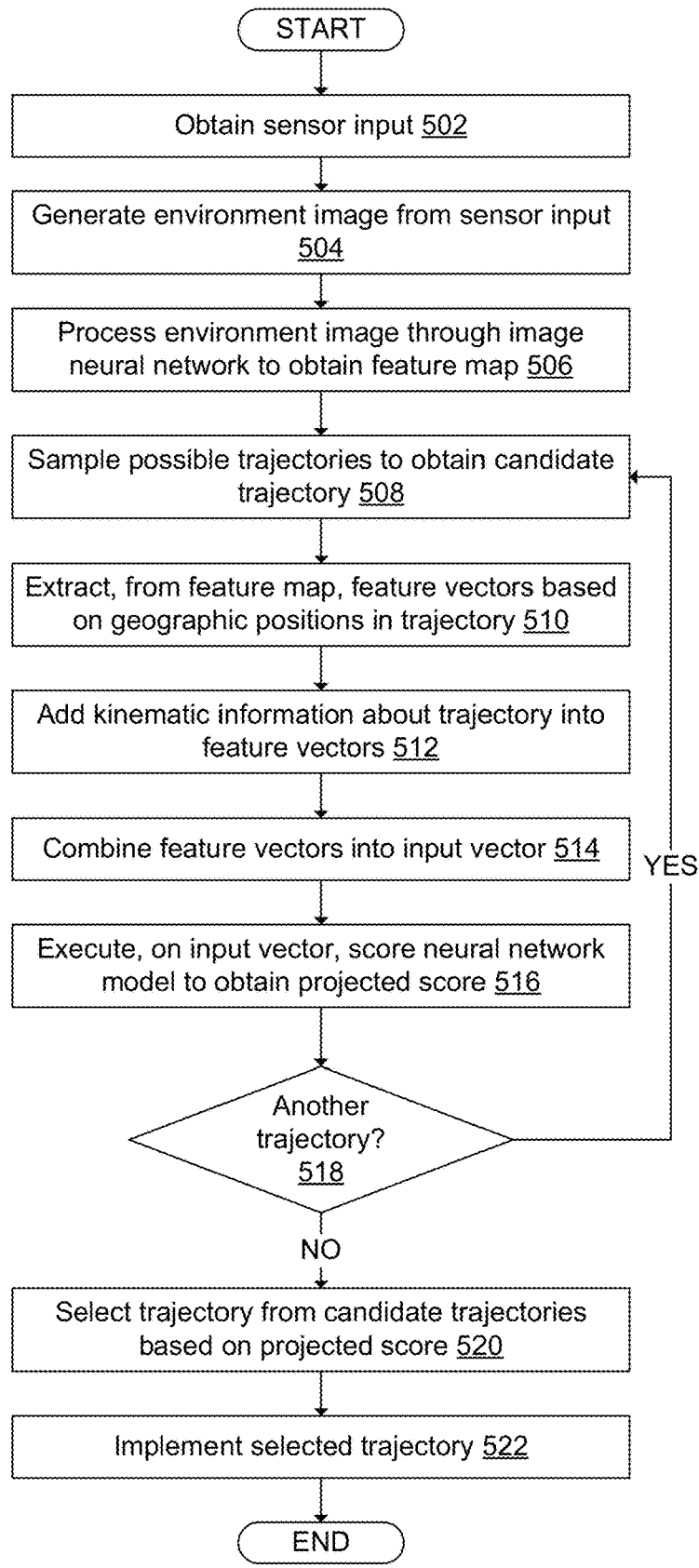
FIG. 5 shows a flowchart for executing a virtual driver in accordance with one or more embodiments.

FIG. 5 shows a flowchart for planning and implementing a trajectory. During training, the trajectory spans only a portion of the scenario. For example, a scenario may be defined for fifteen to thirty seconds and replanning the trajectory may be at one hundred milliseconds. Thus, the operations of FIG. 5 may be performed multiple times over the course of the simulator executing a scenario.

In Block 502, sensor input is obtained. As discussed above, the sensor input is obtained through the sensor input interface either from virtual sensors in the simulated environment or actual sensors of the autonomous system.

From the sensor input, an environment image is generated in Block 504. The sensor input and information known to the autonomous system includes a map as well as current and past states of the autonomous system and other objects. The past states may be the motion history of the past T' seconds. The information is rasterized into a bird's eye view (BEV) tensor, where for each frame within the history horizon T', bounding boxes are around each actor. The autonomous system's past positions are also rasterized similarly into T' additional channels. An M channel tensor may be used to represent the map, where each channel encodes a different map primitive, such as centerlines or the target route. Further, additional channels may be used to represent the (x, y) coordinates of BEV pixels. The result is a generated environment image being a tensor of size $R^{H \times W \times (2T'+M+2)}$, where H and W denotes the size of the geographic region around the autonomous system.

In Block 506, the environment image is processed through the image neural network to obtain a feature map. The image neural network performs down sampling and computes a final feature map $F \in H/8 \times W/8 \times C$, where C is the feature dimension.

In Block 508, possible trajectories are sampled to obtain a candidate trajectory. Different types of trajectory samplings may be used. For example, a map-based trajectory sampler may be used that is based on a roadmap. Different types of trajectories may be sampled by the map-based trajectory sampler. For example, the system may sample lane follow trajectories or lane change trajectories. The lane based trajectories define which lane the autonomous system is in at the end. To perform the sampling, a set of lateral deviations of the current road lane that the autonomous system is located is sampled based on the type of trajectories. The sample set of lateral deviations are determined for different timestamps. Trajectories are generated that satisfy different samplings of lateral deviations. The goal of the sampling is to provide a sample set of candidate trajectories that represent the different possible trajectories of the autonomous system.

By way of a more detailed explanation, the map-based trajectory sampler may sample a set of lane following and lane changing trajectories following a bicycle model. The sampling procedure may use the Frenet frame of the road that provides for sampling trajectories which consider map priors, e.g., follow curved lanes. Specifically, longitudinal trajectories are obtained by fitting quartic splines to knots corresponding to varying speed profiles, while lateral trajectories are obtained by first sampling sets of various lateral offsets (defined with respect to reference lanes) at different longitudinal locations and then fitting quintic splines to the lateral trajectories.

In Block 510, from the feature map, feature vectors are extracted based on the geographic positions of the trajectory. As discussed above, a trajectory may be represented as a sequence of geographic coordinates (e.g., two dimensional waypoints). The granularity of the geographic coordinates of the number of geographic coordinates considered along the trajectory is configurable. For each geographic coordinate, a feature vector from the feature map is obtained. The resolution of the feature map is less than the resolution of the geographic coordinate. Thus, different techniques may be used to obtain the closest feature vector. For example, an average or weighted average of two feature vectors may be used if the geographic coordinates specify a location in the feature map that is between two locations for which feature vectors are stored. By way of a more specific example, consider the scenario in which the feature map has feature vectors for 0 meter and 10 meter, and geographic coordinate is at 5 meter, then the average of the two feature vectors may be obtained for the geographic coordinate. When extracted, the feature vectors are ordered according to the order of the geographic coordinates in the trajectory.

In Block 512, kinematic information about the trajectory is added into the feature vectors. The kinematic information is an encoding of one or more kinematic properties of the trajectory at the corresponding geographic coordinate represented by the feature vector. Further, in one or more embodiments, the geographic coordinates are also added to the feature vector.

In Block 514, the feature vectors are combined into an input vector. The augmented feature vectors may be concatenated together in the order of the corresponding coordinates in the trajectory.

In Block 516, the score neural network is executed on the input vector to obtain a projected score. In one or more embodiments, the input vector is executed by each machine learning model of the score neural network to obtain a corresponding predicted score. The corresponding predicted scores may be combined, such as through summation or averaging to obtain an overall score for the trajectory. For example, the input vector may be processed through a first neural network to obtain a short term score value. The input vector may be processed through a second neural network to obtain a long term score value. Then, the short term score value may be combined with the long term score value to obtain the projected score.

In Block 518, a determination is made whether to process another candidate trajectory. If a determination is made to process another candidate trajectory, the process is repeated. The processing of trajectories may be performed in parallel, such as using a batch operation. For example, a set of trajectories may be sampled and then processed as a batch computation.

In Block 520, a trajectory is selected from the set of candidate trajectories based on the projected score. The trajectory having the most optimal score may be selected. For example, if the highest score is better, then the trajectory having the highest score is selected.

In Block 522, the selected trajectory is implemented. The implementation may be an entire trajectory or only a portion of the trajectory. Specifically, as new sensor input is received, the trajectory may be updated. The virtual driver outputs a set of actuation actions. In the real-world environment, the set of actuation actions control the autonomous system. For example, the set of actuation actions may cause the autonomous system to turn, brake, increase speed, or perform other operations. In the simulator, the simulator receives the set of actuation actions and updates the autonomous system state in the simulated environment. The simulator evaluates the virtual driver accordingly.

Figure 6A:
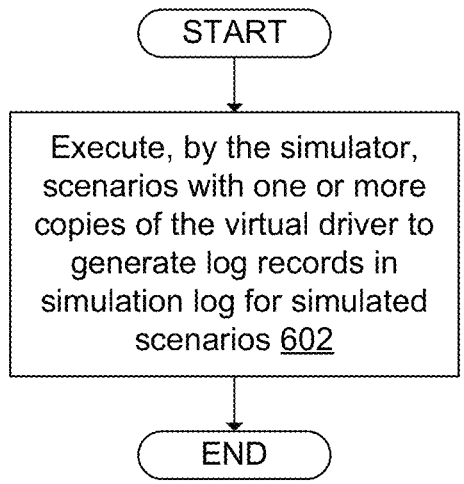
FIGS. 6A, 6B, and 6C shows a flowchart for updating a virtual driver in accordance with one more embodiments.
Figure 6B:
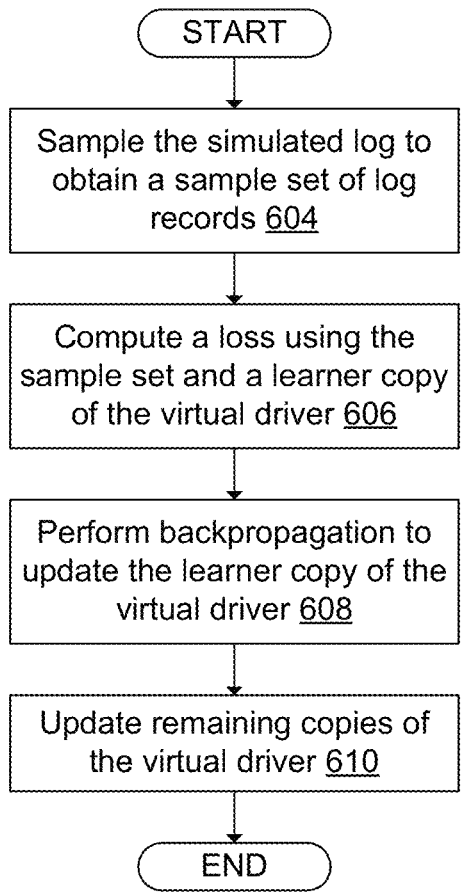
Figure 6C:
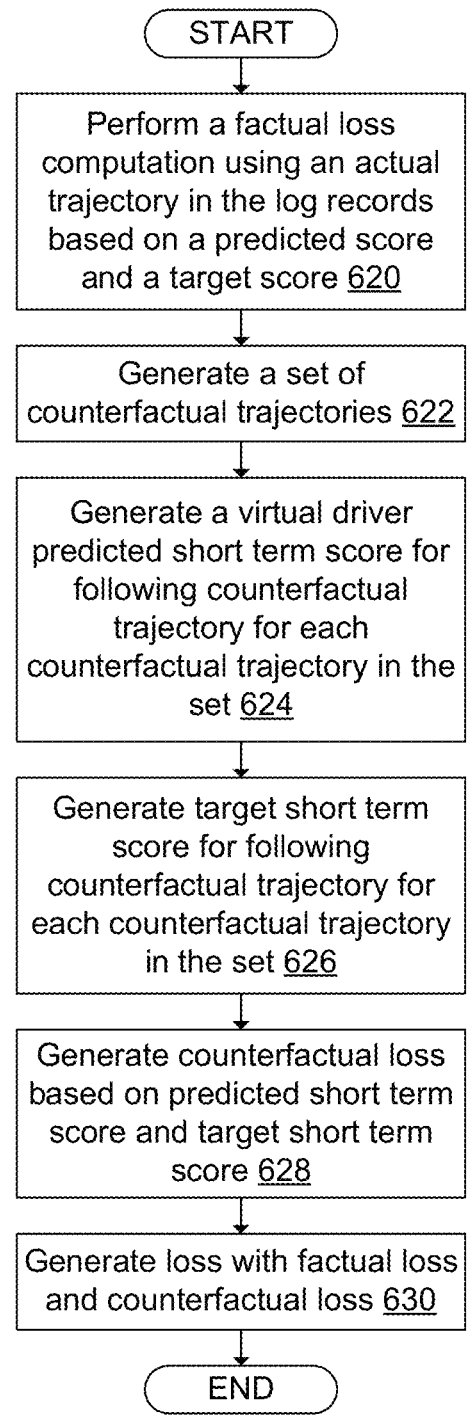

FIGS. 6A, 6B, and 6C show flowcharts for evaluating and updating the virtual driver in accordance with one or more embodiments. In general, teaching the virtual driver may be have two separate asynchronous processes. A first process involves one or copies of the virtual driver interacting with simulator and storing log records of the simulation in a simulator log, which is a data repository of past experiences. Each copy are identical instances of the virtual driver. The second process samples the log records from the simulation log, computes a loss, performs backpropagation on a copy, and then updates the remaining copies. FIG. 6A shows flowchart of the first process. FIG. 6B and FIG. 6C show a flowchart for the second process.

Turning to FIG. 6A, the simulator executes scenarios with one or more copies of the virtual driver to generate log records in a simulation log for the simulated scenarios in Block 602. The simulator simulates a scenario. For each timestep, the virtual driver receives virtual sensor input and outputs actuation actions based on selected trajectories. The simulator updates the autonomous system state and the actors to generate an updated simulated environment state as described above and in FIG. 3. A simulated score is generated based on the performance metrics of the updated simulated environment state. In one or more embodiments, the log records include a state, a planned trajectory, a next state, and the simulated score. The states are the states of the simulated environment and the autonomous system in the simulated environment. The planned trajectory is the trajectory of the autonomous system during the simulation.

Turning to FIG. 6B, the simulated log is sampled to obtain a sample set of log records in Block 604. Various sampling strategies may be performed to obtain the sample set. In one or more embodiment, the update of the virtual driver is based on a batch of the log records as defined by the sample set. In Block 606, a loss is computed using the sample set of log records and a learner copy of the virtual driver. The learner copy may be a separate copy of the virtual driver or a copy of the virtual driver performing Block 602. Calculating the loss is described in reference to FIG. 6C.

In Block 608, backpropagation is performed to update the learner copy of the virtual driver. Through backpropagation, the various weights of the models of the virtual driver are updated using a series of calculations. After updating the learner copy, the remaining copies of the virtual driver are updated in Block 610. The weights from the learner copy may be copied to the other copies of the virtual driver so that the copies of the virtual driver are identical instances. The updating of the virtual driver may cause better scoring of trajectories and correspondingly better operations of the virtual driver for the various scenarios. Training the virtual driver may involve repetitive processing of FIGS. 6A and 6B.

Turning to FIG. 6C, in Block 620, a factual loss computation is performed using an actual trajectory in the log records based on a predicted score and a target score. The factual loss may be calculated as follows. A Q function is defined as Q(state, planned trajectory) and is the predicted score from the virtual driver for following the planned trajectory given state. The predicted score is the summation of the short term score and the long term score as described in FIG. 5. A target score is computed using a combination of the simulated score in the log record, and the virtual driver's prediction of the future state. Specifically, the target score may be calculated using the equation: target score=simulated score+\gamma max_{next trajectory from set of possible trajectories} Q(next state, trajectory). The factual loss is based on the predicted score and the target score for the same single trajectory. The factual loss encourages the virtual driver model's predicted score to match the target score.

Further, counterfactual loss computation is performed. Performing the counterfactual loss computation is described in Blocks 622-628. In Block 622, a set of counterfactual trajectories are generated. The set of counterfactual trajectories are the trajectories that the virtual driver did not choose. For each counterfactual trajectory in the set, a virtual driver predicted short term score for following counterfactual trajectory for is generated in Block 624.

Further, a target short term score is generated for following the counterfactual trajectory in the set in Block 626. The target short term score is a short term score that would be the simulated score if the virtual driver chose the counterfactual trajectory and the remaining actors did not react to the virtual driver. Namely, the target short term score assumes the remaining actor stay in the actor's respective trajectories. Thus, the target short term score reflects how the simulator would score the counterfactual trajectory.

The counterfactual loss is generated based on the predicted short term score and the target short term score in Block 628. The counterfactual loss may be to match the predicted short term score and the target short term score for the counterfactual trajectories. The counterfactual loss may be batched over several thousand counterfactual trajectories by way of an example.

In Block 630, the loss is generated with the factual loss and the counterfactual loss. For example, the loss may be a linear or other combination of the factual loss and the counterfactual loss.

The result of FIGS. 6A-6C is an updating of the virtual drivers predictions of the scores. By updating the virtual drivers' predictions, the virtual driver may select a more optimal trajectory for each scenario.

While the various steps in the flowcharts are presented and described sequentially, at least some of the steps may be executed in different orders, may be combined or omitted, and at least some of the steps may be executed in parallel. Furthermore, the steps may be performed actively or passively. For example, determination steps may be performed when an interrupt is received.

Figure 7:
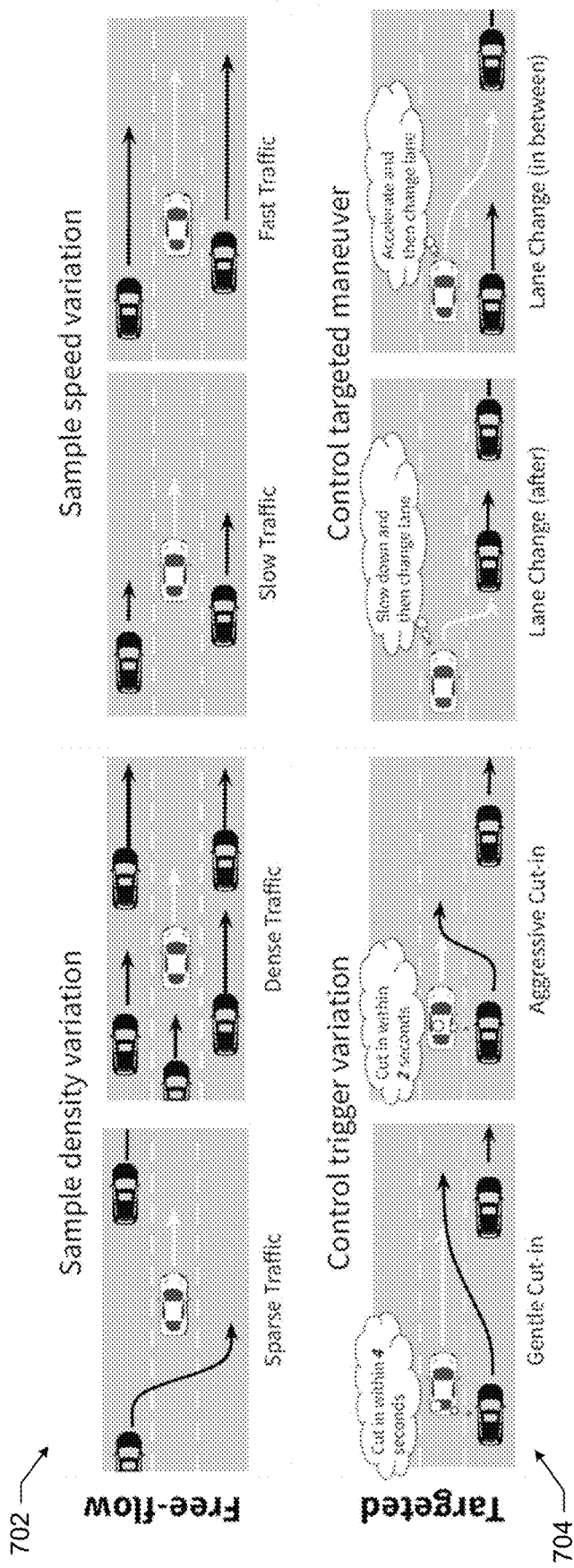
FIG. 7 shows an example for generating scenarios in accordance with one or more embodiments.
Figure 8:
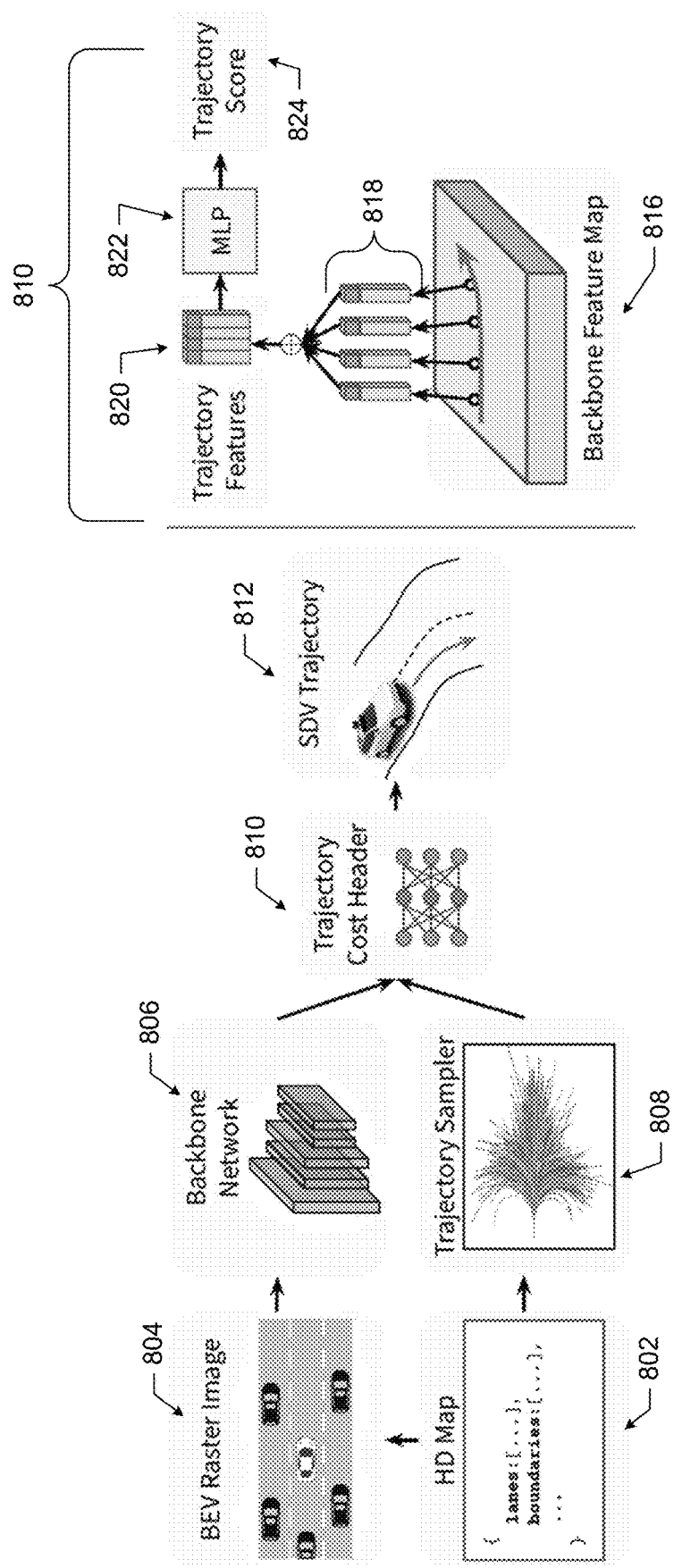
FIG. 8 shows a flow diagram of an example architecture of the virtual driver in accordance with one or more embodiments.
Figure 9:
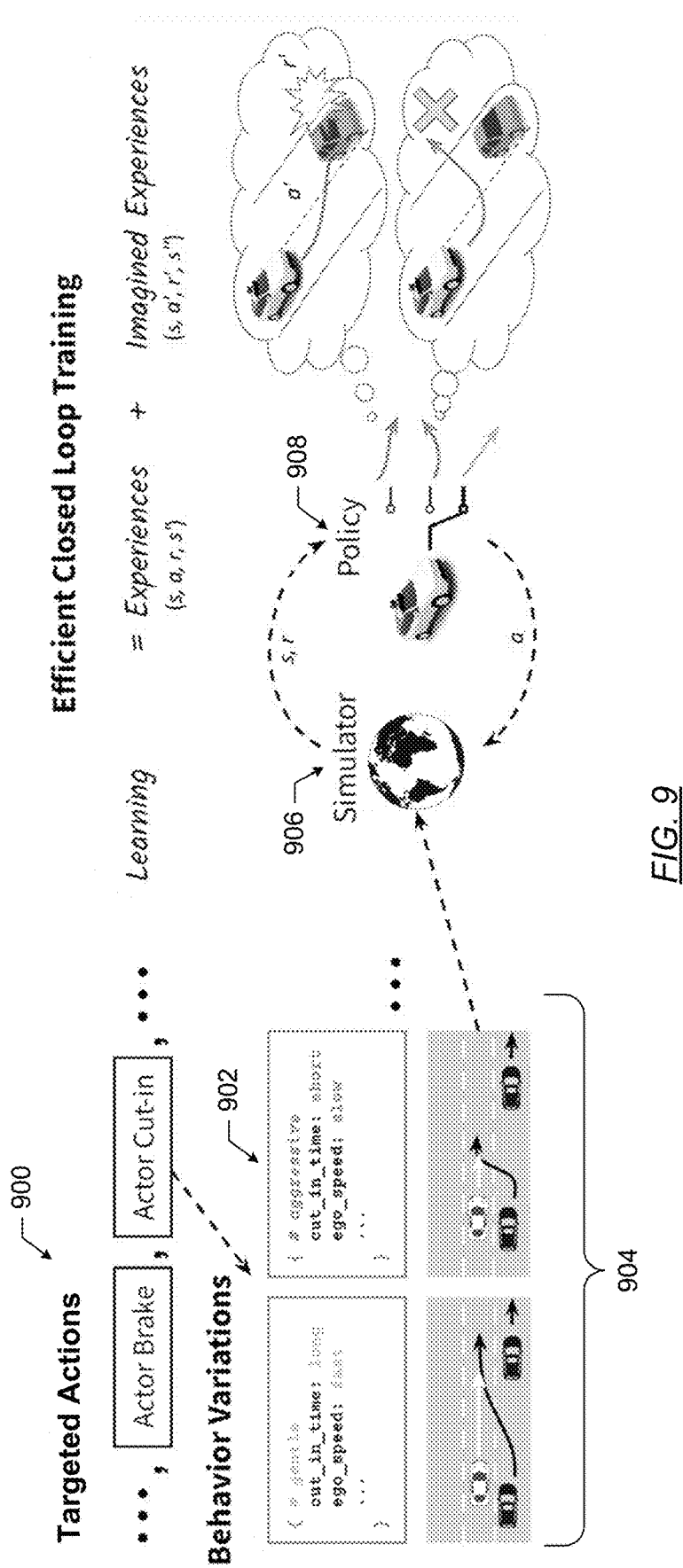
FIG. 9 shows a flow diagram of an example training system in accordance with one or more embodiments.

FIGS. 7-9 show example diagrams in accordance with one or more embodiments. FIG. 7 shows an example for generating scenarios in accordance with one or more embodiments. The top row of scenarios are randomized scenarios (i.e., Free flow) (702) while the bottom row has targeted scenarios (704). Randomized scenarios (702) randomly change parameters, but do not test a particular event. For example, as shown in FIG. 7, randomized scenarios (702) may have density of traffic variations in different scenarios and speed variations of traffic. Targeted scenarios (704) test a particular event. For example, as shown in the bottom row, the targeted scenarios may test how the virtual driver handles a cut-in front of the autonomous vehicle with a variation of the number of seconds to cut in or how the virtual driver moves the autonomous vehicle to a different lane given different traffic densities.

FIG. 8 shows a flow diagram of an example architecture of the virtual driver in accordance with one or more embodiments. As shown in FIG. 8, a map (802) is used with sensor input (not shown) to generate a BEV raster image (804). The BEV raster image (804) is analyzed by a backbone network (806) (i.e., an image neural network) to obtain a feature map (816). The map (802) is also used to as input to a trajectory sampler (808) that generates multiple trajectory samples, which each correspond to a candidate trajectory. The image neural network and the trajectory sampler provide input to the trajectory cost header (810) (i.e., a score neural network model) that outputs a trajectory for the self-driving vehicle (SDV) (812) (i.e., an autonomous system) in the example. On the trajectory cost header, the feature vectors (818) extracted from the feature map (816) the are concatenated together to form input vector (820). The input vector is passed to one or more MLP models (822) to generate a trajectory score (824). By identifying the trajectory with the best score, the optimal trajectory is selected.

FIG. 9 shows a flow diagram of an example training system in accordance with one or more embodiments. Targeted actions (900) are used with behavior variations (902) of the targeted actions (900) to generate targeted scenarios (904). The targeted scenarios are simulated by the simulator (906). Responsive to the simulation, the virtual driver (908) implements a policy by performing an action a of a trajectory, which is further simulated by the simulator. The simulator evaluates the action against other possible actions and outputs a current state of the simulated environment and a score, which is used to update the virtual driver.

Figure 10A:
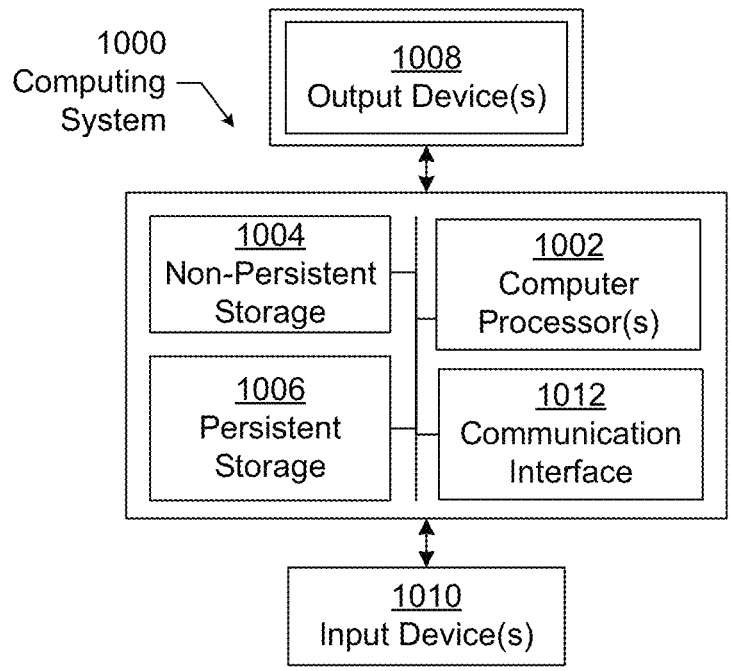
FIG. 10A and FIG. 10B shows a computer system for executing one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processors (1002), non-persistent storage (1004), persistent storage (1006), a communication interface (1012) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing units (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1008). The inputs may include text input, audio input, video input, etc., which may be processed and transmitted by the computing system (1000) in accordance with the disclosure. The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1008) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1008) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 10B:
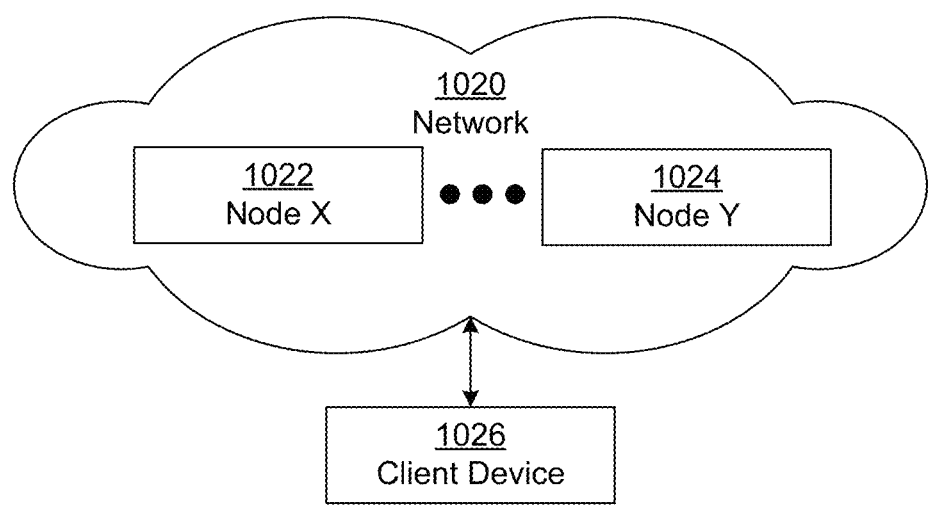

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   generating an environment image from sensor input;
   processing the environment image through an image neural network to obtain a feature map;
   sampling a plurality of possible trajectories to obtain a candidate trajectory for an autonomous system;
   extracting, from the feature map, a plurality of feature vectors corresponding to the candidate trajectory;
   adding, for the autonomous system, kinematic information to each of the plurality of feature vectors prior to combining the plurality of feature vectors into an input vector;
   combining the plurality of feature vectors into the input vector;
   processing, by a score neural network model, the input vector to obtain a projected score for the candidate trajectory;
   selecting, from a plurality of candidate trajectories, the candidate trajectory as a selected trajectory based on the projected score; and
   implementing the selected trajectory.

2. The method of claim 1, further comprising:
   identifying a plurality of geographic positions of the candidate trajectory; and
   using the plurality of geographic positions individually as an index to the feature map to extract the plurality of feature vectors.

3. The method of claim 1, wherein the kinematic information comprises an instantaneous kinematic property of the autonomous system at each of a plurality of geographic positions in the candidate trajectory.

4. The method of claim 1, wherein implementing the candidate trajectory comprises:
outputting a plurality of actuation actions of the candidate trajectory.

5. A method comprising:
generating an environment image from sensor input;
processing the environment image through an image neural network to obtain a feature map;
sampling a plurality of possible trajectories to obtain a candidate trajectory for an autonomous system;
extracting, from the feature map, a plurality of feature vectors corresponding to the candidate trajectory;
combining the plurality of feature vectors into an input vector;
processing, by a score neural network model, the input vector to obtain a projected score for the candidate trajectory, wherein processing, by the score neural network model, the input vector to obtain the projected score for the candidate trajectory comprises:
processing the input vector through a first neural network to obtain a short term score value,
processing the input vector through a second neural network to obtain a long term score value, and
combining the short term score value with the long term score value to obtain the projected score;
selecting, from a plurality of candidate trajectories, the candidate trajectory as a selected trajectory based on the projected score; and
implementing the selected trajectory.

6. The method of claim 5, further comprising:
adding, for the autonomous system, kinematic information to each of the plurality of feature vectors prior to combining the plurality of feature vectors into the input vector.

7. A method comprising:
generating an environment image from sensor input;
processing the environment image through an image neural network to obtain a feature map;
sampling a plurality of possible trajectories to obtain a candidate trajectory for an autonomous system;
extracting, from the feature map, a plurality of feature vectors corresponding to the candidate trajectory;
combining the plurality of feature vectors into an input vector;
processing, by a score neural network model, the input vector to obtain a projected score for the candidate trajectory;
selecting, from a plurality of candidate trajectories, the candidate trajectory as a selected trajectory based on the projected score; and
implementing the selected trajectory, wherein implementing the selected trajectory comprises:
obtaining, from a virtual driver of the autonomous system, a plurality of actuation actions,
updating, in a simulated environment, an autonomous system state based on the plurality of actuation actions,
modeling, in the simulated environment, a plurality of actor actions based on a simulated environment state, and
generating an updated simulated environment state according to the plurality of actor actions and the autonomous system state.

8. The method of claim 7, further comprising:
generating a simulated score based on the updated simulated environment state and the autonomous system state;
calculating a loss function based on the simulated score to obtain a loss, wherein the loss function uses a factual loss and a counterfactual loss; and
updating the score neural network model according to the loss.

9. The method of claim 8, further comprising:
updating the image neural network according to the loss.

10. A method comprising:
obtaining a base scenario for a targeted event and a plurality of ranges of variations of the base scenario;
for each targeted scenario of a plurality of targeted scenarios:
injecting, according to at least one of the plurality of ranges, a variation into the base scenario to generate a targeted scenario, and
storing the targeted scenario; and
training an autonomous system on the plurality of targeted scenarios,
wherein training the autonomous system comprises:
generating an environment image from sensor input,
processing the environment image through an image neural network to obtain a feature map,
sampling a plurality of possible trajectories to obtain a candidate trajectory for the autonomous system,
extracting, from the feature map, a plurality of feature vectors corresponding to the candidate trajectory,
combining the plurality of feature vectors into an input vector,
processing, by a score neural network model, the input vector to obtain a projected score for the candidate trajectory,
selecting, from a plurality of candidate trajectories, the candidate trajectory as a selected trajectory based on the projected score, and
implementing the selected trajectory.

11. A system comprising:
memory; and
a computer processor comprising computer readable program code for performing operations comprising:
generating an environment image from sensor input,
processing the environment image through an image neural network to obtain a feature map,
sampling a plurality of possible trajectories to obtain a candidate trajectory for an autonomous system,
extracting, from the feature map, a plurality of feature vectors corresponding to the candidate trajectory,
adding, for the autonomous system, kinematic information to each of the plurality of feature vectors prior to combining the plurality of feature vectors into an input vector,
combining the plurality of feature vectors into the input vector,
processing, by a score neural network model, the input vector to obtain a projected score for the candidate trajectory,
selecting, from a plurality of candidate trajectories, the candidate trajectory as a selected trajectory based on the projected score, and
implementing the selected trajectory.

12. The system of claim 11, wherein the operations further comprise:
identifying a plurality of geographic positions of the candidate trajectory; and using the plurality of geographic positions individually as an index to the feature map to extract the plurality of feature vectors.

13. The system of claim 11, wherein the kinematic information comprises an instantaneous kinematic property of the autonomous system at each of a plurality of geographic positions in the candidate trajectory.

14. The system of claim 11, wherein processing, by the score neural network model, the input vector to obtain the projected score for the candidate trajectory comprises:
processing the input vector through a first neural network to obtain a short term score value;
processing the input vector through a second neural network to obtain a long term score value; and
combining the short term score value with the long term score value to obtain the projected score.

15. The system of claim 11, wherein the operations further comprise:
obtaining, from a virtual driver of the autonomous system, a plurality of actuation actions;
updating, in a simulated environment, an autonomous system state based on the plurality of actuation actions;
modeling, in the simulated environment, a plurality of actor actions based on a simulated environment state; and
generating an updated simulated environment state according to the plurality of actor actions and the autonomous system state.

16. The system of claim 15, wherein the operations further comprise:
generating a simulated score based on the updated simulated environment state and the autonomous system state;
calculating a loss function based on the simulated score to obtain a loss, wherein the loss function uses a factual loss and a counterfactual loss; and
updating the score neural network model according to the loss.

17. The system of claim 16, wherein the operations further comprise:
updating the image neural network according to the loss.

18. The system of claim 11, wherein the operations further comprise:
obtaining a base scenario for a targeted event and a plurality of ranges of variations of the base scenario;
for each targeted scenario of a plurality of targeted scenarios:
injecting, according to at least one of the plurality of ranges, a variation into the base scenario to generate a targeted scenario, and
storing the targeted scenario; and
training the autonomous system on the plurality of targeted scenarios.

19. A non-transitory computer readable medium comprising computer readable program code for performing operations comprising:
generating an environment image from sensor input;
processing the environment image through an image neural network to obtain a feature map;
sampling a plurality of possible trajectories to obtain a candidate trajectory for an autonomous system;
extracting, from the feature map, a plurality of feature vectors corresponding to the candidate trajectory;
adding, for the autonomous system, kinematic information to each of the plurality of feature vectors prior to combining the plurality of feature vectors into an input vector;
combining the plurality of feature vectors into the input vector;
processing, by a score neural network model, the input vector to obtain a projected score for the candidate trajectory;
selecting, from a plurality of candidate trajectories, the candidate trajectory as a selected trajectory based on the projected score; and
implementing the selected trajectory.

20. The non-transitory computer readable medium of claim 19, wherein the operations further comprise:
identifying a plurality of geographic positions of the candidate trajectory; and
using the plurality of geographic positions individually as an index to the feature map to extract the plurality of feature vectors.

* * * * *